United States Patent
Vorndran

(10) Patent No.: US 7,101,413 B1
(45) Date of Patent: Sep. 5, 2006

(54) METHOD OF APPLYING FLUX TO MOLTEN METAL

(75) Inventor: Jay A. Vorndran, Medina, OH (US)

(73) Assignee: American Metal Chemical Corporation, Medina, OH (US)

( * ) Notice: Subject to any disclaimer, the term of this patent is extended or adjusted under 35 U.S.C. 154(b) by 330 days.

(21) Appl. No.: 10/620,965

(22) Filed: Jul. 15, 2003

Related U.S. Application Data

(60) Provisional application No. 60/396,606, filed on Jul. 16, 2002.

(51) Int. Cl.
*C21C 7/076* (2006.01)

(52) U.S. Cl. .......................................... 75/304; 75/528

(58) Field of Classification Search ................. 75/304, 75/528, 560
See application file for complete search history.

(56) References Cited

U.S. PATENT DOCUMENTS

| | | | |
|---|---|---|---|
| 3,917,125 A | * | 11/1975 | Heinz et al. ................ 266/44 |
| 3,934,637 A | | 1/1976 | Potier |
| 3,951,201 A | | 4/1976 | Dunhem et al. |
| 4,040,469 A | | 8/1977 | Potier et al. |
| 4,069,859 A | | 1/1978 | Nagai et al. |
| 4,327,798 A | | 5/1982 | McCauley et al. |
| 4,430,121 A | * | 2/1984 | Shima ........................ 75/303 |
| 4,634,685 A | | 1/1987 | Pohl et al. |
| 4,785,872 A | | 11/1988 | Koul et al. |
| 5,240,492 A | | 8/1993 | Phillips et al. |
| 5,366,535 A | | 11/1994 | Heaslip et al. |
| 6,179,895 B1 | | 6/2001 | Barker |

* cited by examiner

*Primary Examiner*—George Wyszomierski
(74) *Attorney, Agent, or Firm*—Daniel D. Wasil; Ralph E. Jocke; Walker & Jocke

(57) ABSTRACT

A method of applying flux to molten metal. A heat insulating shell comprises a porous ceramic fibrous refractory material. The shell includes an opening therein. A fluxing material is poured into the shell through the opening and is bonded thereto. The shell with the fluxing material therein is then exposed to molten metal in a casting mold. Only the portion of the fluxing material closest to the opening is exposed to the molten metal. The remainder of the interior fluxing material is thermally insulated from the heat of the exterior molten metal. That portion of the fluxing material that is exposed to the molten metal melts and escapes into the molten metal. Thus, the method provides for applying flux to molten metal in a controlled time release manner.

8 Claims, 2 Drawing Sheets

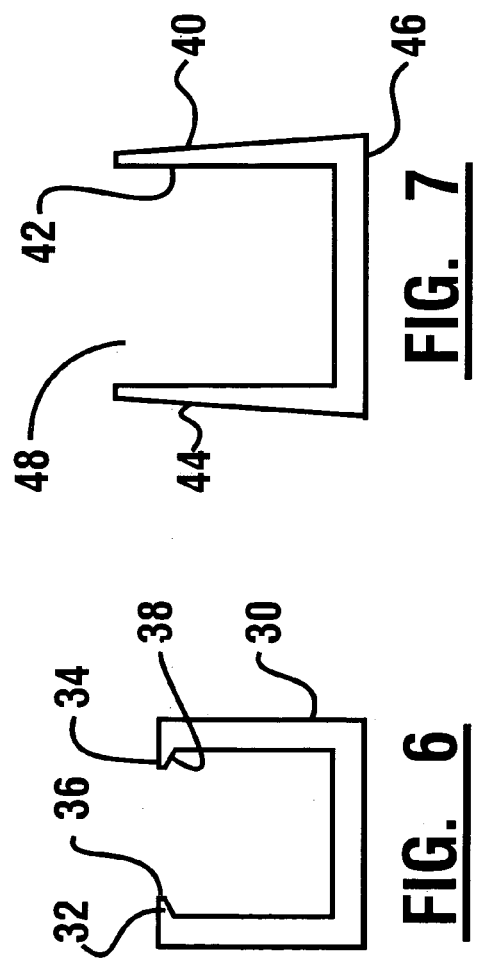
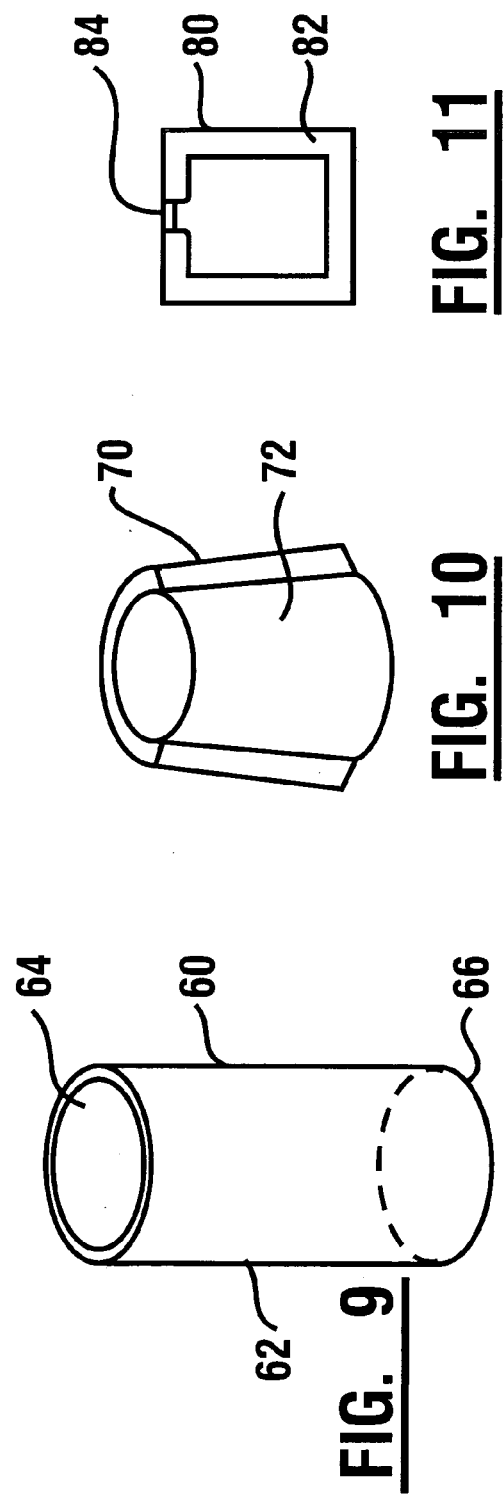

METHOD OF APPLYING FLUX TO MOLTEN METAL

CROSS REFERENCE TO RELATED APPLICATION

This application claims the benefit of U.S. Provisional Application No. 60/396,606 filed Jul. 16, 2002.

TECHNICAL FIELD

This invention relates to an apparatus and method for making metal castings. Particularly, this invention relates to an apparatus and method of introducing a flux material into molten metal during the casting process.

BACKGROUND OF THE INVENTION

The addition of fluxing material (flux) in connection with metal casting techniques is known. Flux can be used to assist in removing impurities that might otherwise be entrapped in the cast metal. The flux may form a slag to contain the impurities.

The use of flux also serves to minimize or eliminate lamination defects. A lamination defect results from the sinking of solid oxidized metal films from an inside surface of a wall. When this solid metal film sinks into the molten metal, due to its greater density, the deoxidizers in the metal attack the oxygen on the surface of the solidified metal film. The result of this reaction is a plane of inclusions and porosity, which is typically called a lamination defect. The solidified metal film also traps inclusions which are attempting to float to the surface. The use of flux may also serve to reduce cold shuts, laps, and surface oxidation. Flux may also provide improved thermal insulation, especially at the top of molten metal.

By forming a fluid slag which may float on the surface of the molten metal, the flux may reduce oxidation of the molten metal and insulates the molten metal surface, minimizing heat loss to the air. This tends to prevent the formation of a solidified metal film caused by excessive heat loss at the surface of the molten metal. Additionally, fluid slag which is formed by the flux can contain the impurities which might otherwise be resident in the molten metal.

The prior art introduction of flux into molten metal can produce quality control problems, especially when a time released flux is desired. Liquid fluxes can be difficult to use in a time released manner and may further require additional agitation of the molten metal. Solid fluxes start to liquify along their outer surface immediately upon contact with molten metal. Solid fluxes may also move to float in the molten metal to locations which can alter the composition of the metal being cast, especially at the surfaces. Furthermore, the introduction of certain fluxes into certain molten metal may cause unwanted emissions. Thus, there exists a need in the art for better controlling of the positioning and the time release of flux material in molten metal.

DISCLOSURE OF THE INVENTION

An object of an exemplary embodiment of the present invention is to provide a flux material which reduces impurities in a cast metal product.

A further object of an exemplary embodiment of the present invention is to provide an apparatus and method which provides a time release of a flux material in a molten metal.

A further object of an exemplary embodiment of the present invention is to provide heat insulating shielding for a flux material to enhance control of the life of the flux material in molten metal.

A further object of an exemplary embodiment of the present invention is to provide a heat shielding outer shell having an inner flux material integral therewith.

A further object of an exemplary embodiment of the present invention is to provide a flux material arrangement which is easy to use and to manufacture.

A further object of an exemplary embodiment of the present invention is to provide heat insulation shielding of a solid flux material to increase the life of the solid flux material in molten metal.

Further objects of exemplary embodiments of the present invention will be made apparent in the following Best Mode for Carrying Out Invention and the appended Claims.

The foregoing objects are accomplished in an exemplary embodiment of the present invention by use of a heat shielding shell having flux material therein. The shell enhances control of the time release of the flux material into a molten metal.

In an exemplary embodiment a shielded flux material is used for reducing impurities in molten metal. For example, the flux material can help to remove alkali, Na, and Ca out of molten aluminum. The flux material can comprise a liquid, a solid, or a mixture thereof (e.g., slurry). The flux material can be a standard organic salt. The flux material may comprise MgCl, NaCl, or CaFl. The flux material can be a fused material. During production of the flux material the fusing thereof can make it homogenous.

The shielding material comprises a shell having heat insulating shielding material on an outer surface thereof. The shell material can be manufactured from heat insulating refractory materials, including man-made fibers. The shell material can be produced to have low densities and high porosities to provide additional good heat insulating properties. The shielding shell can comprise a fibrous refractory material, such as a ceramic fiber. After the shell is produced then the flux material may be added thereto.

The shell may be manufactured by vacuum forming the refractory material from a slurry onto a preformed mesh. The flux material can be fused into gaps or protuberances in the inner wall of the porous fiber shell. The bonding of the flux material to the shell can prevent detachment of the flux material from the shell until the flux material decomposes in a molten metal during its use.

In an exemplary embodiment the shell comprises the shape of a bucket. That is, a refractory shell is substantially closed except at an open end (e.g., the top end). Hence, a shell is able to receive and hold flux material yet also permit the flux material to be exposed to a molten metal. Therefore, the protective shell is able to help control the release of the flux by having a controlled limited flux surface exposed to the molten metal over a longer period of time. The limited or exposed surface of the flux material can correspond to the surface opening of the shell.

In an exemplary embodiment of manufacturing the refractory shell, the process of vacuum forming may be utilized. The process for vacuum forming a shell can comprise the steps of slurrying a mixture of heat insulating materials in a container. A perforated former may be used. The perforated former can be lowered into the mixture. The perforated former may include a first surface and a second surface. The perforated former may include a groove about the perimeter of the first surface. The second surface of the perforated former can be in operative communication with a vacuum source. The vacuum source can be selectively put into and out of fluid communication with the second surface. When the vacuum source is in communication with the second surface it causes the heat insulating materials within the slurry to deposit on the first side of the perforated former. The deposited materials form a heat shielding shell. When the desired thickness of heat insulating materials is deposited, the communication of the vacuum source with the second surface can be stopped, and the formed shell can be removed from the perforated former. The formed shell may comprise a cylindrical shape with a closed end and an open end.

After the refractory shell is produced then the flux material may be added thereto. The flux material may be inserted into the shell by pouring flux material into an opening of the shell. The flux material can become fused or embedded in the pores of the refractory shell. The heat insulating shell and flux material may become integral. Thus, flux material can have heat shielding protection.

BRIEF DESCRIPTION OF DRAWINGS

Exemplary embodiments of the invention are described herein in detail with reference to the accompanying drawings.

FIG. 6 shows a shell having a lip adjacent an opening.

FIG. 7 shows a shell with a tapered outer wall surface.

FIG. 8 shows a shell with an elliptically curved exterior.

FIG. 9 shows a cylindrical shell with open ends.

FIG. 10 is a side elevational view showing a cut away section of a shell with flux material.

FIG. 11 shows a shell having a substantially rectangular body.

BEST MODE FOR CARRYING OUT INVENTION

Figure 3:
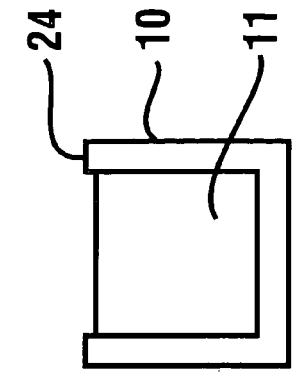
FIG. 3 shows the shell of FIG. 2 containing flux material.

In embodiments of the invention, the fluxing material may be any known material for use in the flux treatment of molten metals, such as in reducing impurities in molten metal. Suitable fluxing agents may include MgCl, NaCl, CaFl, standard organic salt, oxides such as iron oxide ($Fe_2O_3$ or $Fe_3O_4$), carbonates such as sodium carbonate (soda ash) or potassium carbonate, alkali metal and alkaline earth metal fluorides, alkali metal oxides or substance which yield alkali metal oxides on heating, natural or synthetic silicates such as basalt and wollastonite, natural or synthetic borates such as calcium borate or colemanite, and fly ash, fluorspar, ground blast furnace slag, ground cupola slag, or slag mixtures. Mixtures of such fluxing agents may be used to provide compositions adapted to the type and casting temperature of the molten metal. It should be understood that a flux material can be made without using fluoride. A flux material may also liquify to become eutectic. A flux material in the molten metal may cause oxides to float to the upper surface.

The composition of the flux material may be used with a binder. The composition may include carbon. The composition may contain inorganic or organic fibers, such as to increase the mechanical strength of the product. Examples of fibers are asbestos, slag wool, glass wool, rock wool, aluminosilicate fiber, wood, cardboard, paper, and paper pulp. Particulate refractory fillers such as silica, alumina, magnesia, chamotte, vermiculite, and perlite may also be included.

The composition of the flux material may be made in a manner suited to the purpose. For example, the composition may be made by blending the dry ingredients in a cone blender, and adding an aqueous solution such as water with a binder. The composition may also be prepared by forming a slurry of the ingredients in a carrier liquid such as water. The composition may be poured into a shell of the exemplary form of the present invention. Alternatively, the materials forming the composition may be combined in the shell.

Shielding from molten metal heat is provided for the flux material in the exemplary embodiment. The shielding enables enhanced control of the time released liquidization or decomposing of the flux material. The shielding material may comprise a shell having heat insulating shielding material on at least an outer surface thereof. The shell material may be manufactured from heat insulating materials to prevent the flux material from liquefying or melting or dissolving around its entire outer surface. That is, the shell material can control or limit the melting of the flux material to a specific outer surface location.

The shell of an exemplary form of the present invention can be manufactured from insulating exothermic material, heat insulating material, or insulating material. A shell manufactured from exothermic materials may be formed by an injection molding process such as blowing.

Insulating materials typically do not include any component which reacts exothermically. Instead the functionality of insulating materials is based upon their ability to retard heat from the liquid metal through the shell. Therefore, the shell permits a solid flux material (which is not exposed to the molten metal) to substantially maintain a temperature below melting and remain in a substantially solid state. There are primarily two means in which the insulating material act to retard the heat of the liquid metal. The first is the composition of the insulating materials. Insulating materials generally include components with high heat resistance such as man made ceramics incorporating materials such as kaolin clays, silicas, alumina and zirconium. The second means for increasing the insulating properties of shells is in their structure. Shells composed of insulating materials are generally produced to have low densities and high porosities to provide additional good heat insulating properties. To produce these insulating structures fibrous refractory materials are typically used, such as a ceramic fiber.

Insulating exothermic materials may include properties from both the exothermic materials and the insulating materials. These materials can utilize both exothermic reactants and good insulating properties to maintain the temperature of the flux material (which is not exposed to the molten metal) below its melting point. The shell material can also include materials such as aluminum or silicon to produce heat insulating oxides during an exothermic reaction with the molten material.

In an exemplary embodiment of the invention the shell is composed of a mixture of fibrous refractory material held together with a binder. Examples of the materials which compose the fibrous refractory material include calcium silicate fibers, crushed coke, asbestos, slag wool, and eldorite. Other materials may include wood and paper. Examples of binders include resins such as urea-formaldehyde, phenol-formaldehyde and mixtures thereof. Other binders such as starches, dextrins, colloidal silicas and colloidal aluminas can also be used.

The shell can be formed by first slurrying the fibrous refractory material with a binder in an aqueous solution and holding the resulting slurry within a slurry tank. A perforated former can be connected by a conduit to a vacuum pump and adapted to be removable from a immersed end. The perforated former can also be positioned to be immersed in the slurry and the slurry tank and when so immersed to be static in the tank.

In forming the shell of the exemplary embodiment the liquid can be drawn through the perforated former while the fibrous refractory material wetted in the resin is deposited out on the outside surface of the perforated former. The pumping of the liquid can be continued until the desired thickness of fibrous refractory material is deposited on the former by the action of the vacuum pump. The former can then be raised clear of the slurry in the slurry tank. Air can be drawn through the shaped deposit further dewatering it while adding porosity to the walls of the shaped deposit. When the desired water content is achieved, the shaped deposit is stripped from the former by any convenient method. The formed riser shell can then be dried, such as in an oven or other similar apparatus.

In an exemplary embodiment of the invention, the shape configuration of the inner surface of the riser sleeve is formed by the external shape of the perforated former. Alternative methods may be used in creating the shell instead of the above described method.

After the shell is produced then the flux material may be added thereto. Flux material may be placed in the interior of the shell by pouring flux material into an opening of the shell. An aqueous solution or a slurry may comprise the flux composition to permit the pouring thereof. The flux material may be poured in a heated state so that it becomes fused or embedded in the pores of the shell upon cooling or setting. The shell and flux material may be integral after the flux material has been hardened or solidified. Additionally, the inner wall of the shell may include protuberances (e.g., projections, ridges, rings, etc.) or indentations (e.g., gaps, slots, holes, voids, etc.) to provide more contacting surface area to which the flux material can connect or bond. The transformation of the flux material into a solid state may be increased by using a heat exchanger such as a cooler, or by removing the liquid content such as by heating, vacuuming, or using an evaporator.

Alternatively, the flux material may be placed in the shell in a non-liquid state (e.g, as a particulate or solid). Furthermore, the flux material may be heated after it is placed in the shell. For example, a solid component of flux material may be heated in the shell in order to liquify and travel into the pores of the shell. In other embodiments, for example a shell having more than one opening, such as a top and a bottom opening, a removable closure device may be used to seal an opening during a pouring of hot flux material therein. Still other embodiments of adding flux material to a shell may include using plural pours with cooling (or partial cooling) of the previously added flux material between pours. A shell having flux material fused therein may be referred to herein as a flux bucket.

The flux material can be embedded (or migrate) into the porous shield material. The fiber shell can be porous enough to let the flux material fuse thereto, but also dense enough to support the flux material without collapsing. The flux material can be fused into the inner wall of the fiber shell. The flux material may be secured (e.g., embedded) in the shell so that it will not separate, fall out of or become detached from the shell during handling thereof or while in molten metal.

In another exemplary embodiment of the invention a shell may comprise a lip, such as a deformable annular lip, adjacent an opening thereof in order to assist in maintaining or holding flux material therein. A flux material may be inserted into a shell having a lip as a solution or it may be inserted as a prefabricated solid flux material cylinder. A liquid flux material, upon hardening or solidification, can bond with the extra surface area of the lip. Additionally, a lip is able to be of a smaller diameter than flux material in the shell. Thus, a lip can be used to prevent removal of flux material from the shell. For example, a lip may lock flux material in the shell. If an annular lip is used, then it may also be formed by the external shape of a perforated former. The annular lip can comprise a protruding concentric portion which is formed by a mating concentric groove in an annular perforated former.

Other shell arrangements may substantially prevent molten metal from contacting the flux material while the flux material is in the shell. That is, a closure arrangement, such as a pressure difference caused by the heat or density of the molten metal, may be used to keep the molten material outside of the shell. When the pressure inside the shell reaches a predetermined level then the shell is able to release or expel an amount of liquid flux material (which may be liquified flux material). In such an embodiment the shell may act as flux dispenser having a pressure release valve or a one-way valve.

In use the flux within the bucket shell or other housing may be placed in the internal cavity of a casting mold or furnace. For example, the mold may be for an aluminum, iron, or steel casting. The flux and shell may be placed in the mold either before, during, or after the placement or creation of the molten metal into the mold. Additionally, if inserted into molten metal, then the flux bucket can be configured to travel to the bottom of the casting mold or furnace. The melting temperatures of particular metals are known. In an embodiment of a molten metal having a temperature of approximately 1350° F., the flux material may liquify at approximately 880° F. A ceramic fiber shell may melt at approximately 2300° F. Of course other embodiments may have different melting temperatures for the flux material and the shell material in accordance with the casting factors used. For example, a lower molten metal temperature may result in using a lower flux melting temperature. Other factors may include the type of molten metal, the casting process, the metal product, and the economics. Therefore, the life (or consumption time) of a particular flux material and a shell may be precalculated based on the casting factors employed.

After substantially all of the flux material has been released from the shell, due to its liquidization or melting by the hot molten metal and integration therein, the substantially empty shell may be able to float to the top surface of the molten metal. This empty shell action permits retrieval of the shell material from the molten metal. Such retrieval of the shell material may further reduce impurities in the molten metal. The retrieved shell material may also be reusable or recyclable.

Figure 2:
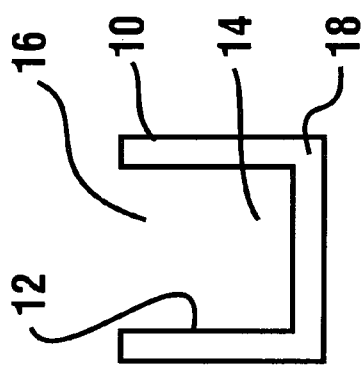
FIG. 2 is a cut away side view of the shell of FIG. 1.
Figure 1:
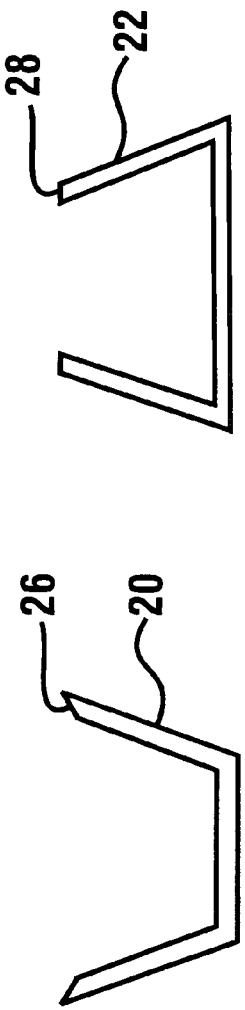
FIG. 1 is an angled view of a shell of an exemplary embodiment of the present invention.

Referring now to the drawings, FIG. 1 shows an angled view of a shell 10. The shell 10 has an annular body of predetermined thickness and diameter, closed end, and an open end. FIG. 2 is a side view of the shell 10 of FIG. 1. FIG. 3 shows a flux bucket comprising flux material 11 in the shell 10 of FIG. 2. The shell 10 of FIG. 2 comprises an inner surface 12 which bounds a generally cylindrical passage 14.

Figure 5:
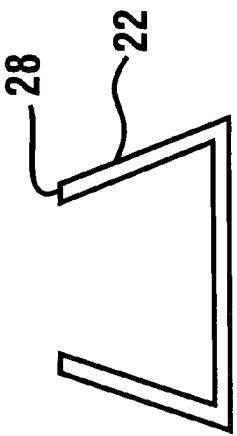
FIG. 5 shows a shell with an inward taper from a closed end to an open end.

The passage includes a longitudinal axis. The passage extends between an open end 16 of the shell and a closed end 18 of the shell. A shell body and passage can be shaped in other alternative configurations. A shell passage may be funnel shaped to facilitate entry of flux material into the shell. For example, a passage may comprise a taper so that an open end is of a larger diameter than a closed end, such as shown in the shell 20 of FIG. 4. A passage may also comprise a taper so that an open end is of a smaller diameter than a closed end, such as shown in the shell 22 of FIG. 5. That is, FIG. 5 shows a shell 22 having an annular body inwardly tapered from a first closed end toward a second open end. This arrangement having inwardly tapering toward the open end enhances securement of a solidified flux material in the shell during handling. For example, the tapered shape of the inner surface may contribute to retaining the flux material in the shell when the open end is positioned lower than the closed end during handling.

Figure 4:
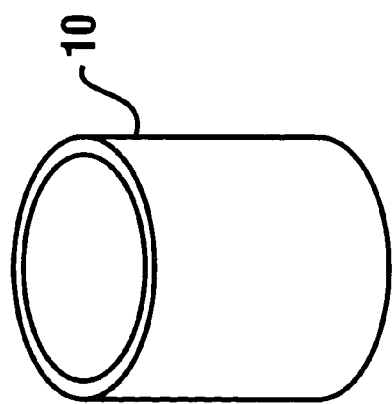
FIG. 4 shows a shell with an outward taper from a closed end to an open end.

An open end surface 24, 28 may extend generally normal (e.g., flat) to the longitudinally inner surface of a shell, such as shown in FIG. 3, or to the closed end of a shell, such as shown in FIG. 5. Of course an open end surface may also have other alternative configurations. For example, an open end surface 26 may be shaped to facilitate entry of flux material into the shell, such as by having a funnel shape and/or a taper, as shown in FIG. 4.

Other embodiments may include using a shell having larger or plural openings. Thus, different sized shells having different sized openings can be employed (individually or simultaneously) in a fluxing process or arrangement to better control the use of flux material to timely reduce impurities in molten metal during a predetermined time period. The time period can be precalculated to assist in controlling the fluxing process. The time period can take into consideration the melting rate of the flux material with respect to flux surface exposure to molten metal temperature. Fluxing material can be released from a shell in a controlled manner. A shell with fluxing material therein can be exposed to molten metal for a predetermined time period where substantially all of the fluxing material is released from the shell to the molten metal during the predetermined time period.

FIG. 6 shows a shell 30 having a projection or lip 32 including a top surface 34 which comprises an extension of the surface of the open end. The projection may comprise a radially extending annular lip of continuous circumference. The annular lip may include an engagement edge 36 which is positioned at the termination of the top surface. The engagement edge may be deformable and have a variable surface area. An annular lip may further comprise a bottom surface 38 which extends from the inner surface to the engagement edge at a predetermined angle, such as a generally 45° angle. An angle can reinforce a lip and minimize the shear stresses when the engagement edge is deformed. When undeformed, the engagement edge may be tapered to a narrow circular surface. When the engagement edge is deformed, such as by a flux cylinder, its surface (and hence the diameter of the inner lip diameter) can be increased. A deformed lip can be used to form a securing or sealing surface in engaging and holding a flux cylinder therewith. Alternatively, once a flux cylinder is inserted into a shell past a lip then the lip is able to return (e.g., snap or flex back from its previously deformed position) to a narrower diameter to lock the flux material cylinder into the shell. Thus, a flux cylinder is able to be captured and secured in the shell by use of a deformable annular lip. That is, an annular lip is able to retain a flux material (having a larger diameter than the undeformed lip) in a shell.

Of course a shell which has flux material poured therein may also include use of a lip to obtain the advantages thereof. It should also be understood that a lip having a configuration other than annular may also be used to serve the same purpose and obtain similar benefits. For example, a lip or radial projection need not be annular nor continuous. Further embodiments may use one or more arms (e.g., cross beams) extending across a shell opening. For example, an arm may comprise a non continuous lip which extends radially from one opening surface point to another opposite point. Such arrangements may be used to strengthen the shell adjacent an open end yet still permit flux material to be poured into the shell. Of course such a supporting or reinforcing arrangement can also contribute to retaining the flux material in the shell after the flux material had solidified.

FIG. 7 shows a shell 40 having a body with an inner wall surface 42 defining a cylindrical interior passage area. The inner wall surface is substantially parallel to the longitudinal axis of the passage. The shell 40 also has an outer wall surface 44 inwardly tapering from a closed end 46 to an open end 48. Less pressure is exerted on the upper wall area than on the lower wall area due to the weight of liquid flux material. Thus, a shell may have a thicker (and stronger) lower wall area and a thinner (and weaker) upper wall area.

FIG. 8 shows a shell 50 having an elliptically curved body 52 with projecting rings 54 therein. As previously discussed, rings may be used to enhance the bonding of poured flux material to the shell body by increasing the available bonding surface.

FIG. 9 shows a shell 60 having plural open ends. The shell 60 comprises a cylindrical body 62 with a first open end 64 and a second open end 66. The broken line shows the outer contour outline of the hidden edge of the second open end.

FIG. 10 is a side elevational view showing a cut away section of another shell 70 having flux material 72 therein.

FIG. 11 shows a shell 80 having a substantially rectangular body 82, such as a square cube, which completely surrounds a flux material. The body includes a specific shell portion 84 which is adapted to create an opening to permit molten metal to contact the flux material through the opening. The created opening in the shell permits liquified flux material to escape into the molten metal. The shell portion 84 may be of material having less structural integrity than the remainder of the shell. The shell portion 84 may leak, break, decompose, or become destroyed (such as by chemically reacting with the molten metal or by exposure to a temperature level for a predetermined period of time). For example, the shell portion 84 may comprise a relatively thin portion, a portion comprising a material different from the remainder of the shell, or a fusible plug which melts at a predetermined temperature. A shell may also include a catalyst which reacts with the molten metal to generate heat to cause an opening in the shell at one or more locations and at one or more time periods.

Thus, the exemplary forms of the invention achieve at least some of the above stated objectives, eliminate difficulties encountered in the use of prior devices, solve problems, and attain the desirable results described above.

In the foregoing description certain terms have been used for brevity, clarity, and understanding. However, no unnecessary limitations can be implied therefrom because such terms are used for descriptive purposes and are intended to be broadly construed. Moreover, the description or illustrations given are by way of examples and the invention is not limited to the exact details shown or described.

In the following claims any feature described as a means for performing a function shall be construed as encompassing any means capable of performing the recited function, and shall not be limited to the structures shown herein or mere equivalents.

Having described the features, discoveries, and principles of the invention, the manner in which it is constructed and operated, and the advantages and useful results attained, the new and useful structures, devices, elements, arrangements, parts, combinations, systems, equipment, operations, and relationships are set forth in the appended claims.

We claim:

1. A process comprising:
   (a) providing a shell comprising a ceramic fibrous refractory material, wherein the shell includes an interior area and a top end, wherein the top end comprises an opening;
   (b) inserting a fluxing material suitable for use in casting molten metal through the opening and into the interior area of the shell, including pouring the fluxing material in liquid form downward through the opening;
   (c) securing the fluxing material to the shell.

2. A process comprising:
   (a) inserting a fluxing material into the interior area of a shell, wherein the fluxing material is suitable for use in molten metal flux treatment, wherein the shell comprises a heat insulating fibrous refractory material, wherein the shell has a higher melting temperature than the fluxing material, wherein the shell comprises a single opening enabling passage therethrough to the interior area, and wherein the inserting includes pouring the fluxing material in liquid form through the opening;
   (b) subsequent to step (a), securing the fluxing material to the shell, wherein the opening enables passage therethrough to secured fluxing material, wherein the securing includes solidifying fluxing material in the interior area, and wherein solidified fluxing material is prevented from passing through the opening.

3. The process of claim 2 wherein the opening has a diameter, wherein step (b) includes integrally connecting fluxing material to the shell, and wherein step (b) further includes providing a solidified fluxing material having a greater diameter than the diameter of the opening.

4. The process of claim 2 wherein the interior area is tapered, wherein step (b) includes forming a tapered solidified fluxing material.

5. The process of claim 2 and further comprising:
   (c) exposing the shell with the fluxing material therein to molten metal, wherein only the fluxing material adjacent the opening is exposed to the molten metal.

6. The process of claim 2 and further comprising:
   (c) exposing the shell with the fluxing material therein to molten metal, wherein the fluxing material has a lower melting temperature than the molten metal, and wherein the shell has higher melting temperature than the molten metal.

7. The process of claim 6 wherein step (c) includes exposing the shell with the fluxing material therein to molten metal for at least a predetermined time period, wherein substantially all of the fluxing material is released from the shell via the opening to the molten metal during the predetermined time period.

8. The process of claim 2 wherein the shell comprises a top end, wherein the top end comprises the opening, wherein step (a) includes pouring the fluxing material in liquid form downward through the opening.

* * * * *